(12) United States Patent
Himayat et al.

(10) Patent No.: US 7,697,906 B2
(45) Date of Patent: Apr. 13, 2010

(54) LINK PERFORMANCE PREDICTION PRESENCE OF CO-CHANNEL INTERFERENCE

(75) Inventors: Nageen Himayat, Fremont, CA (US); Roopsha Samanta, Austin, TX (US); Shilpa Talwar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1048 days.

(21) Appl. No.: 11/394,571

(22) Filed: Mar. 31, 2006

(65) Prior Publication Data

US 2007/0238430 A1    Oct. 11, 2007

(51) Int. Cl.
*H04B 1/04* (2006.01)

(52) U.S. Cl. .................. 455/127.1; 455/67.13; 455/45; 375/260; 370/342; 370/344

(58) Field of Classification Search ...................... None
See application file for complete search history.

(56) References Cited

U.S. PATENT DOCUMENTS

| 7,440,412 | B2 * | 10/2008 | Fu et al. ...................... 370/252 |
| 2003/0193889 | A1 | 10/2003 | Jacobsen |
| 2005/0152465 | A1 | 7/2005 | Maltsev et al. |
| 2005/0190800 | A1 | 9/2005 | Maltsev et al. |

* cited by examiner

*Primary Examiner*—Philip J Sobutka
(74) *Attorney, Agent, or Firm*—Schwabe, Williamson & Wyatt, P.C.

(57) ABSTRACT

Embodiments of apparatuses, articles, methods, and systems for predicting one or more performance metrics for an over-the-air link in the presence of co-channel interference are generally described herein. Other embodiments may be described and claimed.

21 Claims, 3 Drawing Sheets

LINK PERFORMANCE PREDICTION PRESENCE OF CO-CHANNEL INTERFERENCE

FIELD

Embodiments of the present invention relate generally to the field of wireless networks, and more particularly to predicting performance of links in such networks in the presence of co-channel interference.

BACKGROUND

Multi-carrier communication is a technique for transmitting data over a wireless channel, or link, by dividing the data into multiple pieces and transmitting the pieces over several separate narrowband carriers (e.g., sub-carriers). Multi-carrier communication may be used to overcome intersymbol interferences in channels by increasing the symbol period of the carrier, thus limiting the data rate transmitted by each sub-carrier. While the use of multiple carriers may facilitate the achievement of high data rates, it may also complicate the implementation of any strategies used to increase throughput of the system.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
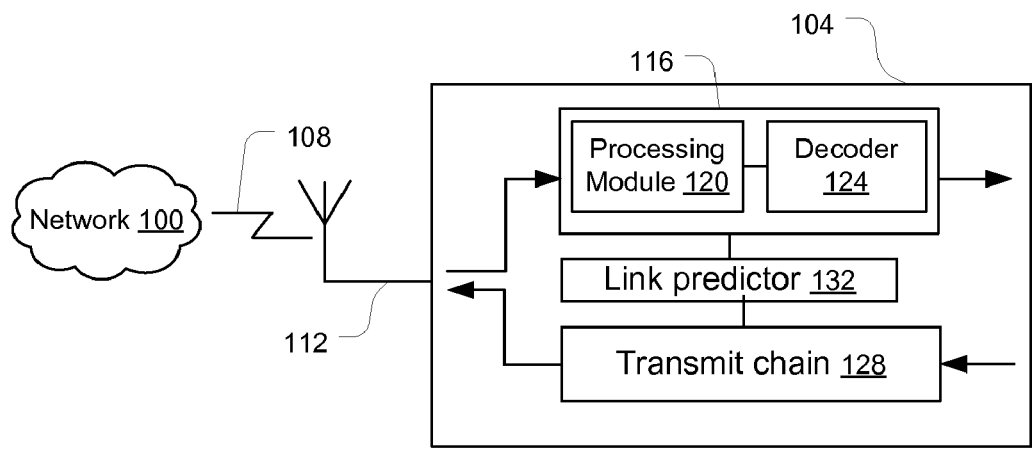
FIG. 1 illustrates a wireless network node in accordance with an embodiment of this invention.

Illustrative embodiments of this invention may include a wireless network node estimating per-sub-carrier noise +interference power and predicting link performance based at least in part on said estimates.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrase "A/B" means "A or B." The phrase "A and/or B" means "(A), (B), or (A and B)." The phrase "at least one of A, B and C" means "(A), (B), (C), (A and B), (A and C), (B and C) or (A, B and C)." The phrase "(A)B" means "(B) or (A and B)," that is, A is optional.

As used herein, the term "component" is intended to refer to programming logic that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++.

A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. Software instructions may be embedded in firmware, such as an electrically erasable programmable read-only memory ("EEPROM"), or may be stored on a readable medium such as a magnetic or optical storage device. It will be further appreciated that hardware components may be comprised of connected logic units, such as gates and flip-flops, and/or may be comprised of programmable units, such as programmable gate arrays or processors. In some embodiments, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

In various embodiments, software components may be implemented by a variety of processing elements (either single- or multi-core) such as, but not limited to, processors, digital signal processors ("DSPs"), application specific integrated-circuits ("ASICs"), and/or controllers.

FIG. 1 illustrates a network node 104 capable of providing wireless communication to and/or from one or more other nodes of a network 100 via an over-the-air ("OTA") link 108 in accordance with an embodiment of this invention. The OTA link 108, which may be accessed by an antenna structure 112 of the node 104, may be a range of frequencies within the radio spectrum, or a subset therein, designated for wireless communication.

The network 100 may comply with a number of topologies, standards, and/or protocols. In one embodiment, various interactions of the network 100 may be governed by a standard such as one or more of the American National Standards Institute/Institute of Electrical and Electronics Engineers (ANSI/IEEE) 802.16 standards (e.g., IEEE 802.16.2-2004 released Mar. 17, 2004) for metropolitan area networks (MANs), along with any updates, revisions, and/or amendments to such. A network, and components involved therein, adhering to one or more of the ANSI/IEEE 802.16 standards may be colloquially referred to as worldwide interoperability for microwave access (WiMAX) network/components.

The node 104 may have components such as a receiver, e.g., receive chain 116 including a processing module 120 and a decoder 124; a transmitter, e.g., transmit chain 128; and a link predictor 132 coupled to one another and the antenna structure 112, as generally shown.

In various embodiments, the antenna structure 112 may include one or more directional antennas, which radiate or receive primarily in one direction (e.g., for 120 degrees), cooperatively coupled to one another to provide substantially omnidirectional coverage; or one or more omnidirectional antennas, which radiate or receive equally well in all directions.

The antenna structure 112 may receive a multi-carrier signal via the OTA link 108 and transmit the signal to the receive chain 116. The multi-carrier signal may transmit data over a number of sub-carriers. In an embodiment, the multi-carrier signal may transmit data using a multi-carrier transmission technique, such as, but not limited to, orthogonal frequency division multiplexing ("OFDM"), which may use orthogonal sub-carriers to transmit information within an assigned spectrum. The multi-carrier signal may include a forward-error corrected ("FEC") block mapped onto an OFDM symbol. Each sub-carrier may contain a signal point of the OFDM symbol.

In some embodiments portions of the multi-carrier signal may be subject to co-channel interference ("CCI") as they are transmitted over the OTA link 108. The CCI may be frequency selective, affecting certain sub-carriers more than others. Therefore, in an embodiment, the link predictor 132 may be coupled to the processing module 120 in order to estimate post-processing noise+interference power for each of the sub-carriers. The link predictor 132 may then use these estimates to predict link performance for a given channel realization in the presence of the temporal CCI. As used herein, predicting link performance may include the prediction of one or more performance metrics of the OTA link 108, e.g., packet error rate ("PER"), for a given channel realization.

In various embodiments, predicting link performance in the presence of CCI may be used to increase spectral efficiency of communications via the OTA link 108 by adapting transmission modes of the transmit chain 128 and/or adjusting operation of the decoder 124 to account for current link conditions.

In an embodiment, the processing module 120 may provide any of a number of signal processing operations such as, but not limited to, equalization, removal of a cyclical extension from a received OFDM symbol, transforming the OFDM symbol from a time domain representation to a frequency domain representation, demapping the OFDM symbol based on a signal constellation of an associated modulation scheme (e.g., quadrature amplitude modulation ("QAM")), etc. The operations provided by the processing module 120 may be dependent upon an architecture of the node 104 of a particular embodiment, e.g., whether the node 104 has a multiple input/multiple output ("MIMO") architecture, a single input/single output ("SISO") architecture, etc.

In various embodiments, e.g., a time-division duplex embodiment, certain operations, e.g., of the processing module 120 may be shared between the receive chain 116 and the transmit chain 128.

In various embodiments, the link predictor 132 may be coupled to the processing module 120 at any of a variety of junctions throughout its operation sequence. For example, in various embodiments, some of which may be shown and discussed below, the processing module 120 may move the signal through a sequence of components such as an equalizer, a demapper, and a log-likelihood ratio ("LLR") interleaver to perform one or more of the operations discussed above. In this embodiment, the link predictor 132 may be coupled to the output of the equalizer, the output of the demapper, and/or the output of the interleaver.

The processing module 120 may output the processed, but still encoded, multi-carrier signal to the decoder 124 for decoding. The decoded multi-carrier signal may then be passed on to other components of the node 104.

In various embodiments, the node 104 may be any type of wireless device, component, or system that uses multi-carrier communication techniques including, for example, wireless client devices for use within wireless networks; wireless access points; wireless network interface cards ("WNICs") and other wireless network interface structures; cellular telephones and other handheld wireless communicators; pagers; laptops, desktops, palmtops, and tablet computers with wireless networking capabilities; personal digital assistants ("PDAs") with wireless networking capabilities; radio frequency integrated circuits ("RFICs"); and/or others.

Figure 2:
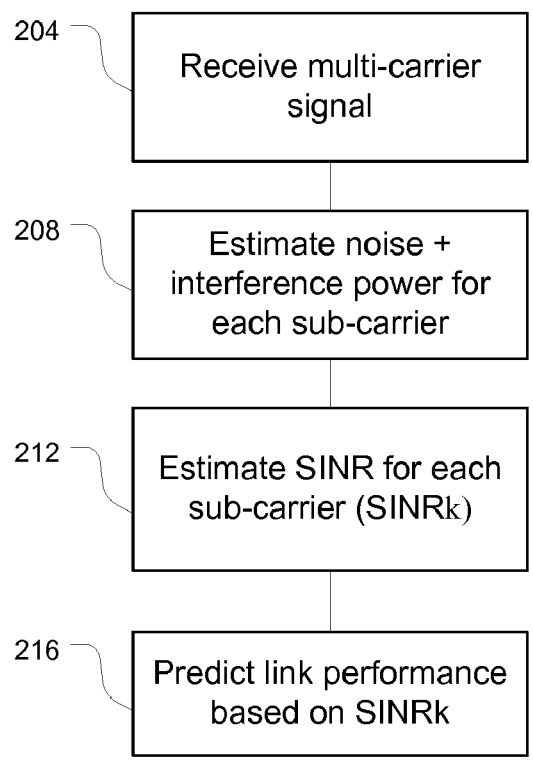
FIG. 2 illustrates a prediction of link performance in accordance with an embodiment of this invention.

FIG. 2 illustrates a link performance prediction in accordance with an embodiment of this invention. Operations may be referenced by numerals in parentheses. For each channel realization, the link predictor 132 may receive the multi-carrier signal from the processing module 120 (204) and estimate a post-processing noise+interference power for each sub-carrier (208). As used herein, "post-processing" may refer to at least some, but not necessarily all, of the signal processing operations provided by the processing module 120.

The link predictor 132 may then estimate a post-processing signal-to-noise + interference ratio ("SINR") for each of the sub-carriers based, at least in part, on the estimated noise+interference powers for each of the sub-carriers (212). In an embodiment, post-processing per sub-carrier SINRs ("SINR$_k$," or "$\gamma_k$", where k is a given sub-carrier) may be estimated by the following equation:

$$\gamma_k = \frac{P_d |h_k^d|^2}{\sigma^2 + P_I^k |h_k^I|^2}, \qquad \text{EQ. 1.}$$

In EQ. 1, $P_d$ and $P^K{}_I$ may be the per sub-carrier power of the desired and interfering signal, respectively. The terms $h_k^d$ and $h_k^I$ may be the instantaneous channel coefficients of the desired and interfering users, respectively. The term $\sigma^2$ may be the noise variance of the additive white Gaussian noise ("AWGN"). The denominator of EQ. 1 may represent the noise+interference power estimated in operation (208).

In some embodiments, estimation of noise+interference power (208) may be based on channel estimates of the desired and interfering signal. In some embodiments, estimation of noise+interference power (208) may be based on estimates of the desired signal, e.g., by capturing the mean-squared error between the received signal and a reconstructructed estimate of the received signal. Further discussion of noise+interference power estimations may be found below in the discussion related to FIGS. 5 and 6.

In some embodiments, the estimation of the per sub-carrier noise + interference power (208) and the estimation of the SINR$_k$s (212) may be separate estimation operations. In other embodiments, estimation of the noise+interference power (208) may be combined with some or all of the estimation of the SINR$_k$s (212).

In various embodiments, estimates of the instantaneous SINR$_k$s may be averaged over a few symbols for each sub-carrier.

In some embodiments, the estimation of the SINR$_k$s may be derived from data symbols during a frame. In other embodiments, pilot and/or preamble symbols may be additionally/alternatively used to estimate SINR$_k$s. As the pilot grid may be assumed to be dense, any SINR$_k$s estimated from the pilot grid may be interpolated for SINR$_k$s estimates of the data sub-carriers.

After the SINR$_k$s have been estimated, they may be used in a composite metric, e.g., a link adaptation metric, to predict link performance (216). The link adaptation metric may be computed across the symbols used to transmit the FEC block.

In an embodiment, an effective SINR ("SINReff" or "$\gamma_{eff}$") may be estimated for use as a composite metric for prediction of the link performance by the following equation:

$$\gamma_{eff} = 2^{\frac{\sum_{k=1}^{N} \log_2(1+\gamma_k)}{N}} - 1, \quad \text{EQ. 2}$$

In EQ. 2, N may be the number of sub-carriers over which a multi-carrier signal is transmitted.

In various embodiments, link adaptation metrics other than SINReff may be additionally/alternatively used such as, but not limited to, mean channel capacity or exponentially effective SINR.

Predicting link performance may be facilitated through the use of physical and/or link layer abstractions ("abstractions"). These abstractions may model performance metrics, e.g., PER performance, to channel conditions. In an embodiment, the link predictor 132 may use these abstractions with the link adaptation metric, e.g., SINReff, to determine an acceptable transmission rate and/or power to be used for transmission while also maintaining the target PER of the system.

In an embodiment adapting transmission modes for multi-carrier signals, the SINReff may be used to predict link performance for each of a number of candidate transmission modes to determine which modes may achieve a predetermined PER target. In an embodiment, the candidate transmission modes may be modulation and coding schemes ("MCS"). The MCS may be selected by the link predictor 132 according to selection criteria of a given embodiment, e.g., achievement of a PER target, transmission rate, transmission power, etc. The selected MCS may then be communicated to the transmit chain 128 for transmissions via the OTA link 108 for a given channel realization. In some embodiments, the selected MCS may be communicated to a network node over the OTA link 108 as feedback. That node may then adapt its transmissions to the network node 104 accordingly for the given channel realization.

Figure 3:
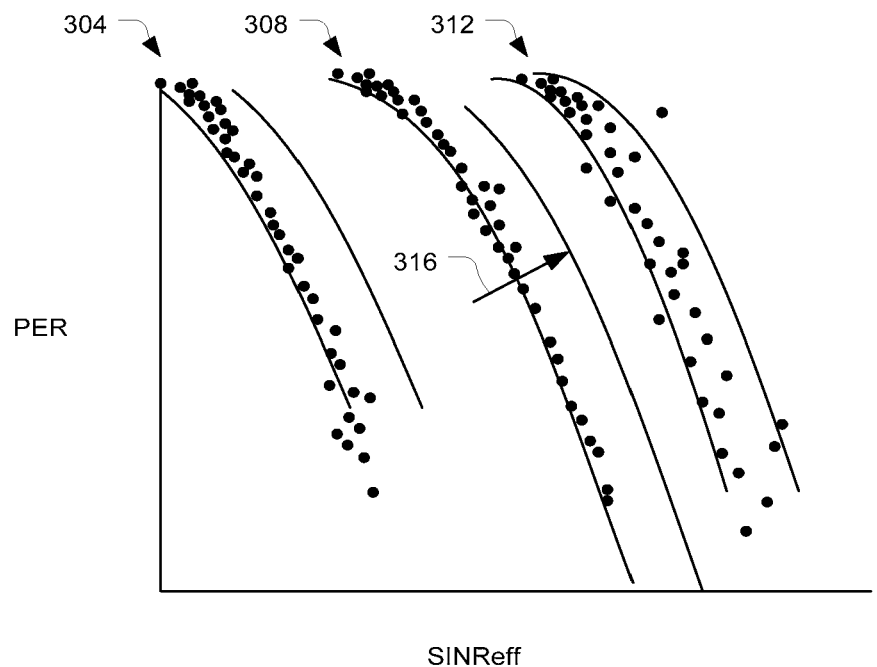
FIG. 3 illustrates a chart showing likelihood of making a target packet error rate for transmission modes given instantaneous channel conditions in accordance with an embodiment of this invention.

FIG. 3 illustrates a chart showing the likelihood of making a target PER given an instantaneous channel realization plotted as a function of corresponding SINReff in accordance with an embodiment of this invention. In this embodiment, CCI may be frequency selective at a 50% loading (e.g., 50% of the sub-carriers cause interference to the desired signal). Transmission over the OTA link 108 may be simulated with three MCSs, e.g., 16 quadrature amplitude modulation ("QAM")—½ (coding rate); 64QAM—½; and 64QAM—⅔. However, in other embodiments any number of MCSs, or other transmission modes, may be considered and abstracted. The dots in FIG. 3 may represent mappings between SINReff and PER for a given channel realization. The solid curves 304, 308, and 312 may represent performance of 16QAM—½; 64QAM—½; and 64QAM—⅔ MCSs, respectively, in an AWGN channel. As can be seen, the mappings may generally follow the AWGN curves. Hence, once the SINReff is determined, the AWGN curves may be used to predict the PER performance. However, there may be instances where the mappings do not follow the AWGN curve exactly. To accommodate these cases, an implementation margin 316 may be added to the curves 304, 308, and 312. The implementation margin may protect against erroneously selecting an MCS scheme, which may be unable to maintain the target PER. In various embodiments, utilizing instantaneous noise + interference power estimations may facilitate use of a smaller implementation margin to maintain target PERs.

In some embodiments, portions of a link performance prediction analysis may be dependent on whether the channel is interference or noise limited. It may be that link performance predictions may be more challenging in an interference-limited scenario, e.g., when the variance of SINR$_k$ values across sub-carriers carrying an FEC block is significant (e.g., if the interferers are frequency selective) and the noise is negligible. Therefore, in an interference-limited scenario an implementation margin may be selected to accommodate the sub-carriers experiencing larger interferences.

Figure 4:
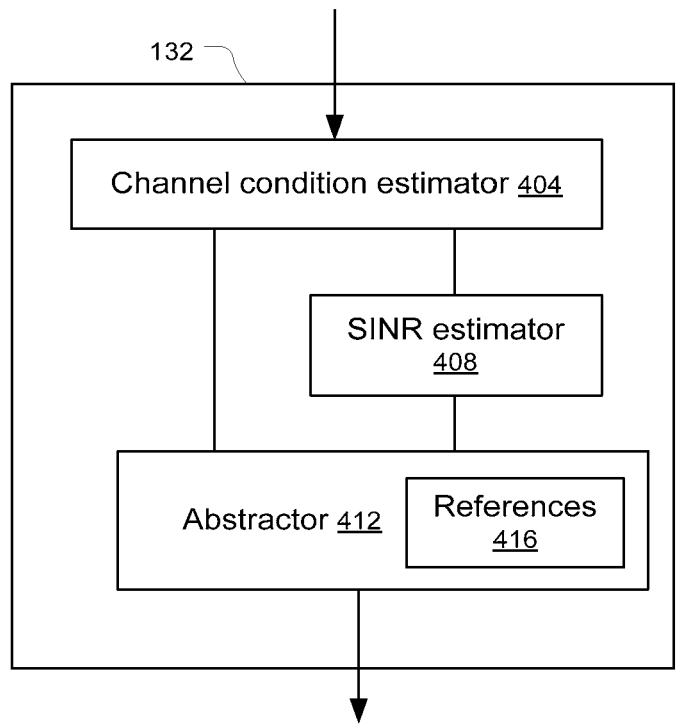
FIG. 4 illustrates a link predictor in accordance with an embodiment of this invention.

FIG. 4 illustrates the link predictor 132 in more detail in accordance with an embodiment of this invention. In this embodiment, the link predictor 132 may have a channel condition estimator 404 to estimate various channel conditions of a particular channel realization such as, but not limited to, gains experienced by the signal through noise+interference and variance of noise+interference power. The link predictor 132 may have an SINR estimator 408 coupled to the channel condition estimator 404 to estimate SINR$_k$ and/or SINReff values based upon the channel conditions.

The link predictor 132 may have an abstractor 412 coupled to the SINR estimator 408 to receive the SINR values. The abstractor 412 may use the SINR values in an abstraction of physical and/or link layer performance for the given channel conditions. The abstractor 412 may include references 416, e.g., PER-SINR mappings, which may be represented as a chart, curve, table, etc., implementation margins, MCS candidates, etc. The abstractor 412 may predict link performance for the MCS candidates based on the SINR values and select an MCS, for transmission that provides a given target PER according to selection criteria of a given embodiment. The MCS selection may be based on an implementation margin, if applicable. The selected MCS may be provided to the transmit chain 128.

In an embodiment, the abstractor 412 may also be coupled to the channel condition estimator 404 to receive estimates of channel conditions directly. This may be useful, for example, in determining if a particular link is interference limited, which may affect selection of an implementation margin and/or the PER lookup tables.

In various embodiments, channel estimations from the channel condition estimator 404; SINR values from the SINR estimator 408; and/or abstraction information from the abstractor 412 may be transmitted to the processing module 120 and/or decoder 124.

Figure 5:
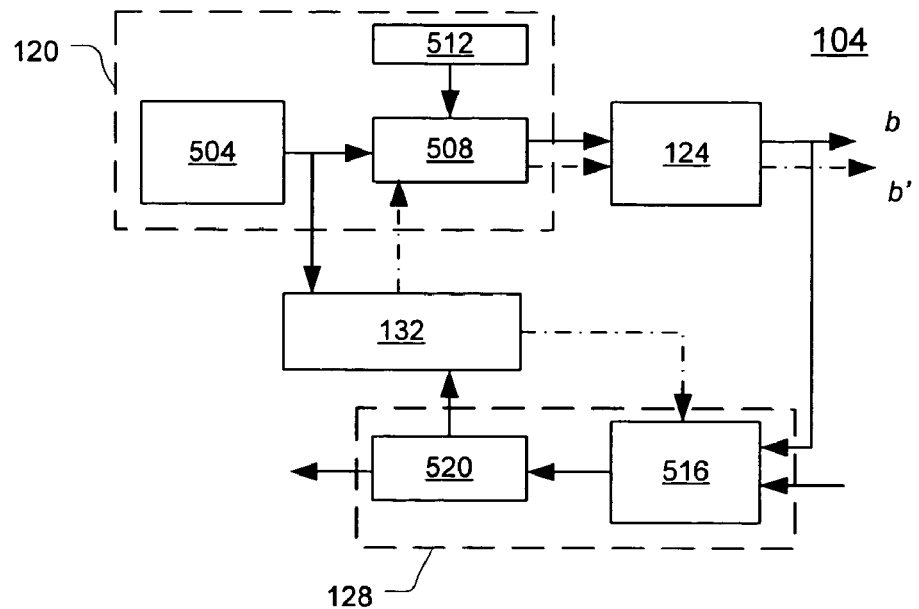
FIG. 5 illustrates a wireless network node in accordance with an embodiment of this invention.

FIG. 5 illustrates the node 104 in accordance with an embodiment of this invention. In this embodiment the processing module 120 may include an equalizer 504, a demapper 508 and an average interference+noise estimator 512. The equalizer 504 may receive a multi-carrier signal represented by the following equation:

$$Y = hs + gx + N, \qquad \text{EQ. 3.}$$

In EQ. 3, Y may be the received signal, h and s may be the channel gains for the desired signal s and the interfering signal x, respectively. N may be AWGN.

The equalizer 504 may receive the signal Y and transmit an equalized signal $\hat{Y}$ to the demapper 508. The demapper 508 may demap the OFDM symbol based on a signal constellation of an associated modulation scheme and transmit the demapped symbol to the decoder 124 for decoding in a predetermined manner. In some embodiments, the demapper 508 may be provided with average interference + noise estimates from the estimator 512 to facilitate at least initial demapping operations.

In an embodiment, the decoding may be done with certain error-correction techniques so that the output b of the decoder 124 may be a more accurate estimation of the actual data transmitted by the multi-carrier signal. The output b may be provided to various components of the transmit chain 128 for symbol regeneration. Symbol regeneration may include re-encoding by an encoder 516 and/or re-mapping by a mapper 520. The link predictor 132 may access the multi-carrier signal from the transmit chain 128, after it is regenerated and compare it to the signal received from the equalizer 504. The link predictor 132 may then base its estimate of instantaneous noise +interference power for each of the sub-carriers on this comparison.

In an embodiment, the demapper 508 and/or the decoder 124 may use the estimates of the instantaneous noise+interference power for respective operations to provide a corrected estimate b' of the data transmitted by the multi-carrier signal.

Figure 6:
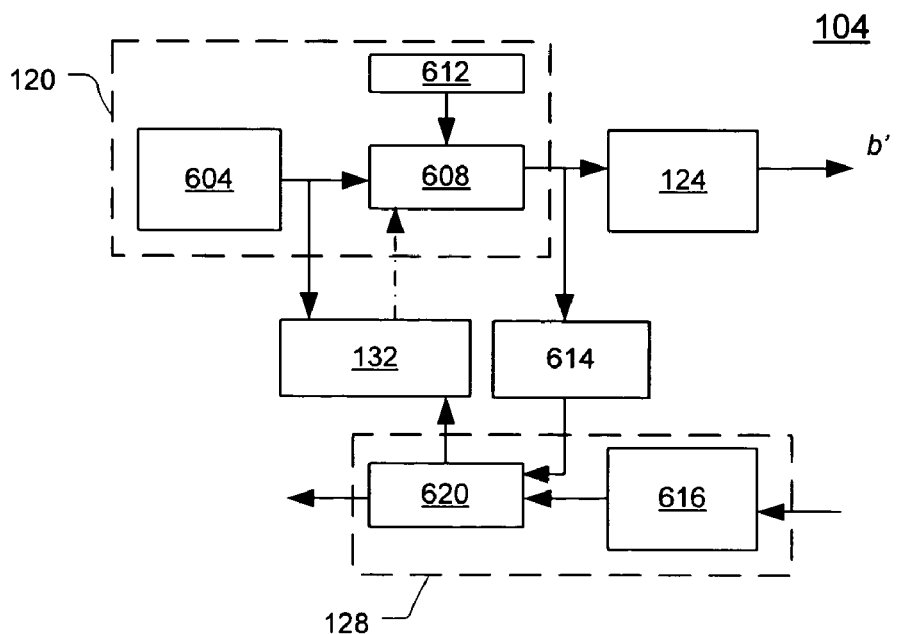
FIG. 6 illustrates a wireless network node in accordance with an embodiment of this invention.

FIG. 6 illustrates the node 104 in accordance with another embodiment of this invention. In this embodiment, the processing module 120 may include an equalizer 604, a demapper 608, and an average noise+interference estimator 612. The components of FIG. 6 may be similar to like-named components described in FIG. 5. However, in this embodiment, the demapped signal may be provided to a hard decision unit 614. The hard decision unit 614 may provide the signal to the mapper 620. The mapper 620 may remap the signal and provide the remapped signal to the link predictor 132 for estimations of noise+interference power and subsequent link predictions. In such a manner the noise+interference power of each of the sub-carriers may be estimated by capturing the mean-squared error between the remapped signal and the received signal prior to channel decoding.

The above discussion may be generally applicable to a wide variety of architectures, e.g., SISO, MIMO, SIMO, MISO, etc. Further details of implementation of link prediction in accordance with particular embodiments may be discussed below.

In various embodiments the node 104 may be compatible with transmissions utilizing any of a number of access schemes such as space-time code ("STC") (e.g., space-time block code ("STBC") or space-time trellis codes ("STTC")), TX and RX diversity scheme, beam-formed, spatial-division multiplexed, space-division multiple access ("SDMA"), pre-coded MIMO, open loop MIMO, closed loop MIMO, etc. Prediction of link performance may be dependent upon the particular architecture of the node 104 used to decode the transmissions. Examples of link prediction metrics for MIMO embodiments decoded with standard linear matched filters, zero-forcing, or minimum-mean-square error ("MMSE") receivers may be shown and described below.

Other embodiments may include extensions and/or adaptations to other single/multiple antenna access schemes.

A general transmission model accounting for Tx/Rx diversity, pre-coded, beam-formed, spatial multiplexing may be shown by the following equation:

$$Y = HP_H S + \sum_{i=1}^{M} G_i P_{M_i} X_i + N, \qquad \text{EQ. 4.}$$

In EQ. 4, Y may be the multi-carrier signal received by Nrx receive antennas for possibly Nsym transmission periods. S may be the desired information signal to be transmitted across multiple transmission symbols and spatial streams. There may be M interferers present in the system with $X_i$ being information symbols transmitted by the $i^{th}$ interferer. The matrices $P_H$ and $P_{Mi}$ may be the pre-coding matrices potentially used by the desired and interfering transmitter, respectively, to match the transmitted signals to the channels of the desired recipients of the signals. The matrices H and $G_i$ may be the channel instances between (the desired Tx and desired Rx) and (the interfering Tx and desired Rx), respectively. For simplicity all interferers may be assumed to be transmitting with the same MIMO scheme (although this assumption is not necessary in determining the post-processing SINR). Furthermore, for simplicity, linear receivers may be assumed to be used to decode the transmitted MIMO signals. Alternate receiver architectures may also be addressed for other embodiments. The linear receiver may be represented by a weight matrix W which may be used to multiply the received signal Y to obtain an estimate of the transmitted signal $\hat{S}$ in the following equation:

$$\hat{S} = WY = W\left(HP_H S + \sum_{i=1}^{M} G_i P_{M_i} X_i + N\right), \qquad \text{EQ. 5.}$$

As an illustration, the weight matrix W may be derived based, at least in part, on the matched filtering, zero-forcing, or MMSE and may use full or partial knowledge of the interference channels, e.g., they may include the class of interference cancelling or interference suppressing receivers.

The post-processing SINR vector after MIMO detection may then be expressed as:

$$SINR = \frac{diag(Cov(diag(WHP_H S)))}{diag(Cov(WN)) + diag(Cov(WHP_H - diag(WHP_H))) + diag\left(Cov\left(W\sum_{i=1}^{M} G_i P_{M_i} X_i\right)\right)}, \qquad \text{EQ. 6.}$$

In EQ. 6, the Cov operation may refer to the computing of the covariance matrix and diag may refer to the diagonal matrix comprising the diagonal entries of the matrix given by the argument of the diag operation.

An example of a MIMO scheme fitting the architecture above may be a 2×1 Alamouti transmission scheme (e.g., an STBC). In this embodiment, the 2×1 Alamouti transmission scheme may have symbols s(1) and s(2) transmitted over two consecutive time periods from two transmit antennas. In this embodiment, the unitary precoding matrices may be identity. One (and possibly more Rx antennas) may be used to receive the transmitted signal. A single Alamouti encoded interferer may be assumed for simplicity.

$$Y = HS + GX + N \Rightarrow \quad \text{EQ. 7.}$$

$$\begin{bmatrix} y_1(1) \\ y_1^*(2) \end{bmatrix} = \begin{bmatrix} h_{11} & h_{21} \\ h_{21}^* & -h_{11}^* \end{bmatrix} \begin{bmatrix} s(1) \\ s(2) \end{bmatrix} + \begin{bmatrix} g_{11} & g_{21} \\ g_{21}^* & -g_{11}^* \end{bmatrix} \begin{bmatrix} x(1) \\ x(2) \end{bmatrix} + \begin{bmatrix} n(1) \\ n(2)^* \end{bmatrix},$$

The receiver used to decode the received signals may be a matched filter H* matched to the channel H and the resulting SINR expression may be:

$$SINR = \frac{diag(Cov(H^*Hs))}{diag(CovH^*Gx) + diag(Cov(H^*N))} \quad \text{EQ. 8.}$$

$$= \frac{diag\left((|h_1|^2 + |h_2|^2)^2 \frac{P_d}{2} I\right)}{diag\left((|h_1|^2 + |h_2|^2)(|g_1|^2 + |g_2|^2) \frac{P_I}{2} I\right) + diag(\sigma^2(|h_1|)^2 + |h_2|^2)I)},$$

An example of another MIMO scheme fitting the architecture above may be a 2×2 spatial multiplexing MIMO transmission scheme without precoding. In this embodiment, symbols s1 and s2, corresponding to the same or different FEC blocks, may be spatially multiplexed by transmitting them simultaneously from two Tx antennas, as shown in the following equation:

$$Y = HS + GX + N \Rightarrow \quad \text{EQ. 9.}$$

$$\begin{bmatrix} y_1 \\ y_2 \end{bmatrix} = \begin{bmatrix} h_{11} & h_{21} \\ h_{12} & h_{22} \end{bmatrix} \begin{bmatrix} s_1 \\ s_2 \end{bmatrix} + \begin{bmatrix} g_{11} & g_{21} \\ g_{12} & g_{22} \end{bmatrix} \begin{bmatrix} x_1 \\ x_2 \end{bmatrix} + \begin{bmatrix} n_1 \\ n_2 \end{bmatrix},$$

At the receiver, the two spatially multiplexed symbols may be separated through linear MMSE filters, described by EQ. 10, in such a way that the SINR of all the sub-carriers used to transmit the symbols in a given FEC block may be available for link performance predictions for the FEC block.

$$W = H^*(HH^* + \sigma^2 I)^{-1} \text{ OR } W = H^*(HH^* + P_I GG^* + \sigma^2 I)^{-1}, \quad \text{EQ. 10.}$$

Once the abstractions are performed based on the post-processing SINR expressions, the PER may be looked up with respect to PER-SINR mappings that may be adjusted for MIMO receiver performance with CCI.

Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:

1. A method comprising:
   receiving, by a network node, a multi-carrier signal via an over-the-air link;
   estimating, by the network node, a noise plus interference power for each of a number of subcarriers of the multi-carrier signal; and
   predicting, by the network node and for each of the number of subcarriers, one or more performance metrics of the over-the-air link for each of a number of transmission modes, said predicting based at least in part on the estimated noise plus interference power, the performance metrics predicting a packet error rate for each of a number of transmission modes;
   selecting, by the network node and for each of the number of subcarriers, a transmission mode from the number of transmission modes based at least in part on the predicted one or more performance metrics for the over-the-air link for each of the number of transmission modes.

2. The method of claim 1, wherein each of the number of transmission modes is associated with a transmission rate and/or a transmission power and said selecting of the transmission mode from the number of transmission modes is based at least in part on the transmission rate and/or transmission power of each of the number of transmission modes.

3. The method of claim 1, further comprising:
   transmitting another multi-carrier signal via the over-the-air link with the selected transmission mode.

4. The method of claim 1, further comprising:
   transmitting the selected transmission mode to another network node via the over-the-air link to be used for transmissions by the another network node.

5. The method of claim 1, wherein the number of transmission modes comprise a number of modulation and coding schemes.

6. The method of claim 1, further comprising:
   decoding the multi-carrier signal based at least in part on the estimated noise plus interference power for each of the number of sub-carriers.

7. The method of claim 1, further comprising:
   estimating a signal-to-interference plus noise ratio for each of the sub-carriers based at least in part on the estimated noise plus interference power for each of the number of subcarriers.

8. The method of claim 1, wherein said predicting comprises:
   mapping, for each of the number of subcarriers and for each of the number of transmission modes, an estimated noise plus interference power associated with a subcarrier to a packet error rate for an associated transmission mode.

9. The method of claim 8, wherein said mapping further comprises:
   mapping using a chart, curve or a table that maps noise plus interference power to packet error rate for each of the number of transmission modes.

10. The method of claim 1, wherein said estimating a noise plus interference power comprises estimating an instantaneous noise plus interference power.

11. An apparatus comprising:
    a receive chain configured to receive a multi-carrier signal via an over-the-air link; and
    a link predictor coupled to the receive chain and configured to estimate a noise plus interference power for each of a number of sub-carriers of the multi-carrier signal and to predict one or more performance metrics for the over-the-air link based at least in part on the estimated noise plus interference powers for each of the number of sub-carriers.

12. The apparatus of claim 11, wherein the link predictor is further configured to predict one or more performance metrics for the over-the-air link for each of a number of transmission modes.

13. The apparatus of claim 12, wherein the one or more performance metrics includes a packet-error rate for the over-the-air link for each of the number of transmission modes.

14. The apparatus of claim 12, wherein the link predictor is further configured to select a transmission mode from the number of transmission modes based at least in part on predicted one or more performance metrics for the over-the-air link for each of the number of transmission modes.

15. A machine accessible medium storing associated instructions, which, when accessed, results in a machine:
   receiving a first multi-carrier signal via an over-the-air link;
   estimating a noise plus interference power for each of a number of subcarriers of the multi-carrier signal; and
   predicting one or more performance metrics for the over-the-air link based at least in part on the estimated noise plus interference power for each of the number of sub-carriers.

16. The machine accessible medium of claim 15 storing instructions, which, when accessed, further results in the machine:
   predicting the one or more performance metrics for the over-the-air link for each of a number of transmission modes.

17. The machine accessible medium of claim 16 storing instructions, which, when accessed, further results in the machine:
   predicting a packet error rate for the over-the-air link for each of the number of transmission modes.

18. The machine accessible medium of claim 16 storing instructions, which, when accessed, further results in the machine:
   selecting a transmission mode from the number of transmission modes based at least in part on predicted one or more performance metrics for the over-the-air link for each of the number of transmission modes.

19. A system comprising:
   an omnidirectional antenna configured to provide access to an over-the-air link;
   a receive chain coupled to the omnidirectional antenna and configured to receive a multi-carrier signal via the over-the-air link; and
   a link predictor, coupled to the receive chain and configured to estimate a noise plus interference power for each of a number of sub-carriers of the multi-carrier signal and to predict one or more performance metrics for the over-the-air link based at least in part on the estimated noise plus interference powers for each of the number of sub-carriers.

20. The system of claim 19, wherein the link predictor is further configured to predict one or more performance metrics for the over-the-air links for each of a number of transmission modes.

21. The system of claim 19, wherein the system comprises a multiple-input and/or multiple-output network node.

* * * * *